(12) United States Patent
Tseng

(10) Patent No.: US 6,824,859 B2
(45) Date of Patent: Nov. 30, 2004

(54) PROTECTIVE FILM PRODUCT CAPABLE OF RADIATING FAR INFRARED RAY WITH WAVELENGTH OF 4 $\mu$M~14 $\mu$M

(76) Inventor: Chien-Tu Tseng, 6F-1, No. 88, Section 3, Hsin-Shen South Road, Taipei (TW)

( * ) Notice: Subject to any disclaimer, the term of this patent is extended or adjusted under 35 U.S.C. 154(b) by 0 days.

(21) Appl. No.: 10/014,541

(22) Filed: Dec. 14, 2001

(65) Prior Publication Data

US 2003/0049473 A1 Mar. 13, 2003

(51) Int. Cl.$^7$ .............................................. B32B 7/02
(52) U.S. Cl. ..................... 428/215; 428/216; 428/328; 428/329; 428/330; 428/331; 428/336; 428/451
(58) Field of Search ................................. 428/213, 215, 428/216, 328, 329, 330, 331, 336, 451

(56) References Cited

U.S. PATENT DOCUMENTS 3,442,686 A * 5/1969 Jones .......................... 428/336
5,002,511 A * 3/1991 Maki ............................ 446/14

* cited by examiner

Primary Examiner—D. S. Nakarani
(74) Attorney, Agent, or Firm—Bacon & Thomas

(57) ABSTRACT

In ordinary temperature some ceramic materials can absorb the environmental energy and radiate appropriate amount of far infrared ray with wavelength of 4 $\mu$m~14 $\mu$m. Far infrared ray with wavelength of 4 $\mu$m~14 $\mu$m can be absorbed by cell molecules of the living beings to cause resonance and activation. By utilizing this property, the slurry of the far infrared ceramic materials is coated with $\mu$m-grade thickness on some flexible base films to form the product of the present invention, and is used as as a wrappage, a protective lining, . . . etc., so as to achieve the freshkeeping for the food, the late-ripen for the picked fruits, as well as the warmkeeping, raising and healthkeeping for the living beings.

7 Claims, 1 Drawing Sheet

PROTECTIVE FILM PRODUCT CAPABLE OF RADIATING FAR INFRARED RAY WITH WAVELENGTH OF 4 μM~14 μM

FIELD OF THE INVENTION

The present invention relates to a thin film product capable of radiating far infrared ray with wavelength of 4 μm~14 μm for the use of protecting, and more particularly to a thin film product that is made by coating some far infrared ceramic materials on a base film, and is used as a wrappage, a protective lining, . . . etc., so as to achieve the freshkeeping for the food, the late-ripen for the picked fruits, as well as the warmkeeping, raising and healthkeeping for the living beings.

BACKGROUND OF THE INVENTION

The range of infrared ray is between 0.76 μm~1000 μm, and can be classified into near infrared ray, medium infrared ray and far infrared ray. The range of far infrared ray is between 3 μm~1000 μm, in which the range of 4 μm~14 μm can cause resonance of and be absorbed by the living beings, while the range of 8 μm~12 μm can cause resonance of and be absorbed by the human body.

Any substance with temperature will radiate far infrared ray. When radiated by far infrared ray, water, high molecular materials and organic materials will absorb far infrared ray. Since far infrared ray has more thermal power than a visable light to penetratrate into the human body to irritate the cell molecule, thus many health machines are invented to utilize the property of the far infrared ray, sauna bath equipment is a very good example.

In ordinary temperature, some special ceramic materials can absorb the environmental energy and radiate appropriate amount of far infrared ray, the appropriate amount of far infrared ray has been proved by medical experiment to be very healthful to living beings.

OBJECT OF THE INVENTION

It is therefore an object of the present invention to utilize the fact that in ordinary temperature some special ceramic materials can absorb the environmental energy and radiate appropriate amount of far infrared ray, and let the slurry of the special ceramic materials be coated on some base films to form a very thin surface layer, after drying the base film and, the thin surface layer will be bonded tightly together, and present excellent flexibility to be used as a wrappage material, a protective lining, . . . etc., so as to achieve the freshkeeping for the food, the late-ripen for the picked fruits, as well as the warmkeeping, raising and healthkeeping for the living beings.

DETAILED DESCRIPTION OF THE INVENTION

Figure 1:
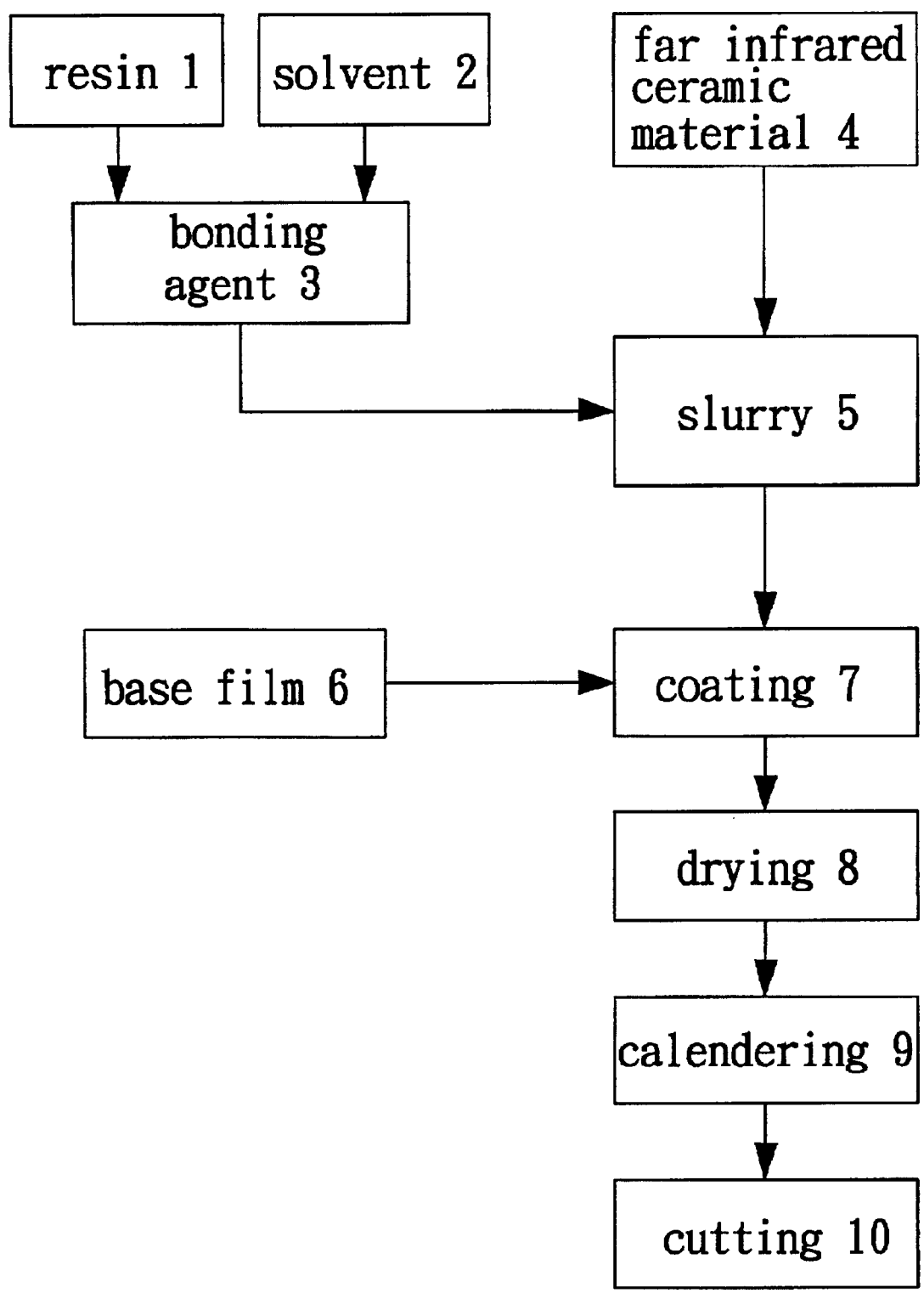
FIG. 1 shows schematically the manufacturing process of coating special ceramic far infrared materials on a base film of Polyester (PET) according to the present invention.

A fresh-keeping film (wrap) for food will be the first example to describe the present invention.

Currently the fresh-keeping film for home use is a Polyvinyl Chloride (PVC) film or a Polyethylene (PE) film product with thickness between 5~15 μm, and is used for wrapping fresh food to isolate dust and preventing the fresh food from drying.

The fresh-keeping firm for food of the present invention is for example a product with Polyester (PET) film as the base film. The thickness of the base film is for example between 10~30 μm. Then the slurry of some far infrared ceramic materials is coated on the base film of PET, with thickness between 2 μm~7 μm depending upon the use and the purpose. When a fresh food is wrapped With the above-mentioned product, since the far infrared ceramic materials can absorb the environmental energy and radiate appropriate far infrared ray of wavelength 4~14 μm to penetrate into the fresh food, so as to irritate the cell molecules thereof, the fresh food is therefore to be kept in fresh for a longer time.

However, the manufacturing process to coat the slurry of far infrared ceramic materials on the base film of PET with μm level is not very easy to achieve by some ordinary equipments. The present invention employs some special equipments and a special manufacturing process to accomplish the coating.

Referring to FIG. 1, which shows schematically the manufacturing process of coating special far infrared ceramic materials on a base film of Polyester (PET) according to the present invention.

First of all, a resin 1 and a solvent 2 are mixed up to form a bonding agent 3, and then a far infrared ceramic material 4 is mixed up with the bonding agent 3 to form slurry 5. The far infrared ceramic material 4 is for example a mixture of materials selected from the group consisting of $Al_2O_3$, $Fe_2O_3$, $TiO_2$, $Cr_2O_3$, $SiO_2$, $Y_2O_3$, MgO, $ZrO_2$, the mixing ratio depends upon different applications. The equipments for forming the slurry 5 are for example the products of ASADA Co. (Japan) as below:

1. CONCENTRIC TWIN DESPA MACHINE (MC-40),
2. SAND MELL MACHINE (MECHA GAPER GM-2G), and
3. LINE MILL MACHINE (TORNADO TG-110).

Other equivalent equipments of other companies can also be employed.

Next, a base film 6 is provided, i.e. the Polyester (PET) film. Then the coating machine R-MT of HIRANO Co. (Japan) is employed to coat the slurry of far infrared ceramic material on the PET film (step 7). The coating machine R-MT is a precision machine for μm-grade thickness coating, other equivalent coating machine of other companies can also be employed. The coating thickness cannot exceed the thickness of the base film of PET. The thinner the coating thickness is, the lower the cost is. Therefore, a precision coating equipment is very important to the present invention.

The step after coating is drying 8, and then the step of calendering 9 (if necessary). The calendaring equipment is for example the equipment of YURI ROLL MACHINE Co. (Japan), other equivalent machine of other companies can also be employed. The final step is cutting 10, and then the product of far infrared ceramic material coated on the base film of PET is accomplished.

The base film 6 is not limited to the above-mentioned PET film, the base film can be a Polyolefins film, such as Polyethylene (PE) film, Polypropylene (PP) film, etc. Any other flexible or plastic chemical film, thin paper, thin metal foil, thin cloth can be the base film of the present invention. The thickness of the base film is between 4 μm~200 μm, depending upon the purpose and the production technology. The coating thickness of the far infrared ceramic material is between 1 μm~50 μm. Coating can be done on one (internal side or external side) or two sides of the base film, depending upon the purpose and the production technology.

The application of the present invention is widespread, not only applicable to fresh-keeping film for food for enhancing the freshkeeping of the food, but also applicable to wall decorative paper to achieve the warmkeeping of a room. If the fresh-keeping film for food coated with far infrared ceramic material is processed with permeation to wrap the growing fruit, the raising effect for the fruit is enhanced. If moth/bacteria proofing materials (e.g. chitin chitosan or propolis) are added during the manufacturing process, then the moth/bacteria proofing can also be achieved. If the product of the present invention is used to wrap the fresh food for export delivery, it is apparent that the food under wrapping can keep fresh for a longer period. The ripeness/rot of a picked fruits under wrapping of the product of the present invention will be deferred, thus it is advantageous to long distance delivery and sale.

When the base film coated with far infrared ceramic material is made into various packaging products, it is no doubt the packaging products are advantageous to the substance therein.

Blanket/quilt for home use can also envelop a lining that is coated with far infrared ceramic material, and is processed with permeation when necessary. Furnitures such as a desk or a chair can also be put on with a special pad that is coated with far infrared ceramic material. Student stationeries such as satchel or plastic pad can also be coated with far infrared ceramic material.

The present invention can also mix the far infrared ceramic materials with PET material or any other original material of a flexible or plastic chemical film, thin paper, thin metal foil, thin cloth, instead of coating as mentioned above, and can achieve the same effects of freshkeeping for the food, the late-ripen for the picked fruits, as well as the warmkeeping, raising and healthkeeping for the living beings.

When a thin aluminum/tin foil coated with far infrared ceramic material is used to wrap meat for roasting, since far infrared ceramic material can absorb thermal energy and radiate far infrared ray, the meat is therefore roasted uniformly.

The spirit and scope of the present invention depend only upon the following Claims, and are not limited by the above embodiments.

What is claimed is:

1. A flexible film product comprising a flexible film base having a thickness of between 4 $\mu$m~200 $\mu$m coated with a thin coating of a ceramic material which absorbs environmental energy and radiates far infrared radiation of wavelength 4~14 $\mu$m, wherein said far infrared ceramic material is selected from the group consisting of $Al_2O_3$, $Fe_2O_3$, $TiO_2$, $Cr_2O_3$, $SiO_2$, $Y_2O_3$, MgO, $ZrO_2$ and mixtures thereof and wherein the thickness of the coating of ceramic material is between 1 $\mu$m ~50 $\mu$m, and said ceramic material of said coating is dispersed in a bonding agent; with the proviso that the thickness of said coating is less than the thickness of said film base.

2. A flexible film product according to claim 1 (wherein the flexible film base is a polyester, a polyolefin, thin paper, thin metal foil or a thin cloth.

3. A flexible film product according to claim 2 wherein the polyester is a PET film.

4. A flexible film product according to claim 2 wherein the polyolefin film is polyethylene or polypropylene.

5. A flexible film product according to claim 2 wherein the thin metal foil is aluminum foil or a tin metal foil.

6. A flexible film product according to claim 1 wherein the flexible film base is a polyvinyl chloride film.

7. A flexible film product according to claim 2 wherein the flexible film base is a polyolefin.

* * * * *